US012677857B2

(12) United States Patent
Cerny et al.

(10) Patent No.: US 12,677,857 B2
(45) Date of Patent: Jul. 14, 2026

(54) SMOKE FLAVORING COMPOSITIONS PRODUCED FROM CEREAL BRAN

(71) Applicant: Firmenich SA, Satigny (CH)

(72) Inventors: Christoph Cerny, Shanghai (CN);
Yi-Chun Ding, Shanghai (CN);
Wen-Juan Xiang, Shanghai (CN)

(73) Assignee: Firmenich SA, Satigny (CH)

( * ) Notice: Subject to any disclaimer, the term of this patent is extended or adjusted under 35 U.S.C. 154(b) by 238 days.

(21) Appl. No.: 18/551,398

(22) PCT Filed: Mar. 15, 2022

(86) PCT No.: PCT/EP2022/056727
§ 371 (c)(1),
(2) Date: Sep. 19, 2023

(87) PCT Pub. No.: WO2022/194879
PCT Pub. Date: Sep. 22, 2022

(65) Prior Publication Data
US 2024/0164422 A1 May 23, 2024

(30) Foreign Application Priority Data

Mar. 19, 2021 (WO) ................ PCT/CN2021/081825
May 4, 2021 (EP) ..................................... 21172102

(51) Int. Cl.
*A23L 27/27* (2016.01)
*A23L 27/20* (2016.01)

(52) U.S. Cl.
CPC ............. *A23L 27/27* (2016.08); *A23L 27/204* (2016.08)

(58) Field of Classification Search
CPC ..................................................... A23L 27/27
See application file for complete search history.

(56) References Cited

U.S. PATENT DOCUMENTS

2018/0042275 A1 2/2018 Ortiz et al.

FOREIGN PATENT DOCUMENTS

| | | | | |
|---|---|---|---|---|
| CN | 104222980 | 12/2014 | | |
| CN | 111712138 | 9/2020 | | |
| EP | 2 033 524 B1 | 5/2015 | | |
| EP | 3 060 071 B1 | 4/2019 | | |
| JP | H-11225717 A | * | 8/1999 | |
| WO | WO-2019170813 A1 | * | 9/2019 | ............... A21D 2/36 |

OTHER PUBLICATIONS

Sung "Analysis of Volatile Constituents of Different Temperature Rice Hulls Liquid Smoke", Chia-Nan Annual Bulletin, vol. 33, pp. 1-12, 2007 (Year: 2007).*

(Continued)

*Primary Examiner* — Michele L Jacobson
(74) *Attorney, Agent, or Firm* — Knobbe, Martens, Olson & Bear, LLP

(57) ABSTRACT
The various aspects presented herein relate to flavoring compositions with smoky-like aroma profile for use in flavored consumer products, and methods for the preparation of such flavoring compositions.

16 Claims, 3 Drawing Sheets

Roasting time (h)

——●——250°C
——●——235°C
——●——230°C
——○——225°C
——○——220°C
——○——200°C

(56)                    References Cited

OTHER PUBLICATIONS

Inamuddin et al. (2021). Green Sustainable Process for Chemical and Environmental Engineering and Science—Solvents for the Pharmaceutical Industry—14.3.1.3 Hydrodistillation. Elsevier. Retrieved from https://app.knovel.com/hotlink/pdf/id:kt01310971/green-sustainable-process/hydrodistillation (Year: 2021).*

Park et al. "Antioxidant and chemosensory properties of rice (*Oryza sativa* L.) bran under different oven-roasting conditions" Food Chemistry 476 (2025) 143496 (Year: 2025).*

Anonymous, "Guiaiacol", Sigma Aldrich Specification Sheet, (Aug. 13, 2020), p. 1.

Anonymous, "Development of New Technologies to Minimize Acrylamide in Food", (Jan. 1, 2005), pp. 1-82.

Knowles, M.E. et al. "Phenols in smoked cured meats. Phenolic composition of commercial liquid smoke preparations and Derived Bacon", J. Science of Food and Agriculture, vol. 26, No. 2, (Feb. 1, 1975), pp. 189-196.

Kosowska, M. et al. "Key Aroma Compounds in Smoked Cooked Loin", J. Agricultural and Food Chemistry, vol. 66, No. 14, (Apr. 11, 2018), pp. 3683-3690.

Ross, K. et al. "Comparative analysis of pyrolysis products from a variety of herbaceous Canadian crop residues", J. Analytical and Applied Pyrolysis, vol. 7, No. 6, (Jan. 1, 2011), pp. 763-776.

Wittkowski, R. et al. "Formation of Smoke Flavor Compounds by Thermal Lignin Degradation" in Chemistry, Process Design, and Safety for the Nitration Industry /ACS /Symposium Series, American Chemical Society/Oxford University Press, vol. 490, (May 13, 1992), pp. 232-243.

European Food Safety Authority, Jun. 2015, Scientific Opinion on acrylamide in food, 13(6):1-321.

Fiddler et al., 1967, Thermal decomposition of ferulic acid, J Agric Food Chem, 15:757-761.

International Search Report & Written Opinion dated Sep. 22, 2022 In application No. PCT/EP2022/056727.

Juliano, 1985, Rice Chemistry and Technology, Chapter 2, Am Assoc Cereal Chemists, pp. 17-18.

Mattila et al., 2005, Contents of Phenolic Acids, Alkyl- and Alkenylresorcinols, and Avenanthramides in Commercial Grain Products, J Agric, 53:8290-8295.

Notice of first office action dated Jul. 16, 2025 in Chinese patent application No. 202280008442.3.

Poisson et al., 2008, Characterization of the Most Odor-Active Compounds in an American Bourbon Whisky by Application of the Aroma Extract Dilution Analysis, Agric Food Chem, 56:5813-5819.

Sapwarobol, 2021, Biological Functions and Activities of Rice Bran as a Functional Ingredient: A Review, Nutr Metab Insights 14:11786388211058559.

Yang et al., Nov. 30, 1992, Human Nutrition and Food Hygiene, Shaanxi People's Education Press, p. 228.

* cited by examiner

SMOKE FLAVORING COMPOSITIONS PRODUCED FROM CEREAL BRAN

This present application is a U.S. national phase entry under 35 U.S.C. § 371 of PCT Application No. PCT/EP2022/056727, filed Mar. 15, 2022, which claims priority to Chinese PCT Patent Application No. PCT/CN2021/081825, filed Mar. 19, 2021 and European Patent Application No. 21172102.2, filed May 4, 2021. The entire contents of these applications are explicitly incorporated herein by this reference.

TECHNICAL FIELD

The various aspects presented herein relate to flavoring compositions with smoky-like aroma profile for use in flavored consumer products, and methods for the preparation of such flavoring compositions.

BACKGROUND

Smoke flavouring compositions which are used to mimic the taste and smell of grilled or cooked foods are popular additives in consumable products. For example, such flavourings have a long use in preparing meats, cheese, fish, snacks. Furthermore, in recent years there has been an increase in the popularity of fake meat and vegetarian substitutes for health and environmental reasons. The use of smoke flavouring compositions in such food stuffs is desirable from a consumer perspective.

Smoke flavourings can be obtained from wood combustion and condensing the smoke. The resulting smoke condensate (liquid smoke) is purified, further processed and used in foods to confer smoke aroma. However smoke flavourings obtained by wood combustion at high temperatures can include toxic compounds such as polycyclic aromatic hydrocarbon(s) (PAH). This can mean that smoke flavourings obtained from wood combustion can be regarded as unsafe or not natural by regulatory legislation, for example in the EU.

Hence there is a need to develop flavoring compositions having smoky-like aroma profile but without problematic amounts of toxic compounds such as polycyclic aromatic hydrocarbon(s) (PAH).

The aim of the present invention is to provide such flavoring compositions.

DESCRIPTION OF THE FIGURES

FIG. 1. Formation of phenolic compounds from ferulic acid

FIG. 2. Chemical structure of target phenols (numbers refer to Table 1)

DETAILED DESCRIPTION

Figure 3:
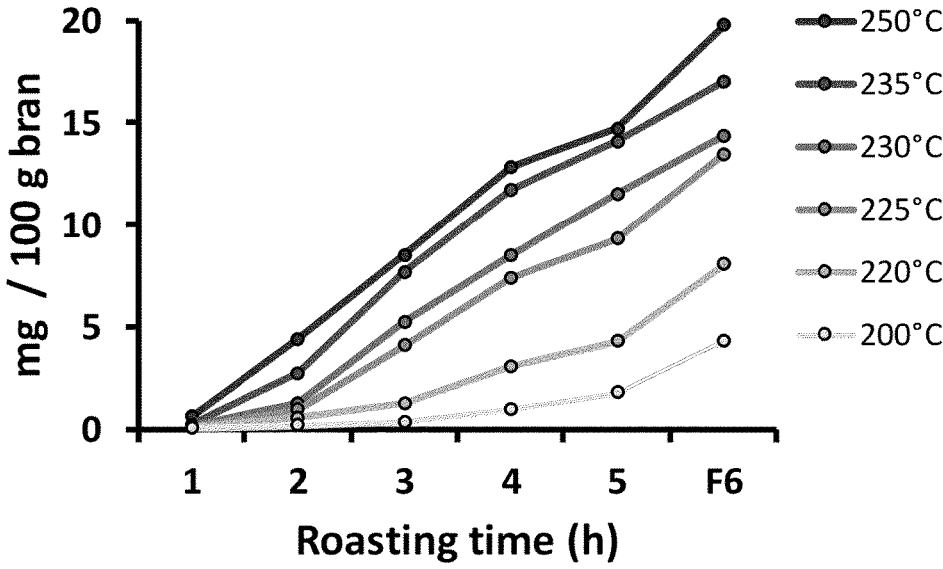
FIG. 3. Guaiacol formation during roasting of rice bran at various temperatures FIG. 4. Influence of cereal variety on phenol formation (235° C., 5 h)

The present invention provides a flavoring composition having smoky-like aroma profile comprising one or more aroma compound(s) selected from the group comprising: 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol E-isoeugenol, Z-isoeugenol, 4-vinyl phenol, 4-propyl guaiacol and 2,6-dimethoxyphenol, characterized in that the composition has less than 300 ppb of polycyclic aromatic hydrocarbon(s) and/or acrylamide.

As used herein the term "PAH" means polycyclic aromatic hydrocarbon(s).

Flavoring composition having smoky-like aroma profile are popular additives to a variety of consumer products. However increasing awareness concerning the toxicity of certain compounds produced by the preparation process has lead to some countries and jurisdictions introducing minimal acceptable quantities of such compound in food stuffs for human consumption. For example EU regulations limits the amount of PAH and acrylamide in smoky-like aroma profiles. The PAH benzo[a]pyrene (BaP) is limited to 10 ppb. Acrylamide is another potentially toxic compound in thermally treated food. The benchmark level in the EU is 300 ppb in cereal products.

Existing methods of preparing flavoring composition having smoky-like aroma profile involve using wood-based starting materials which are heated for a prolonged period of time at a high temperature. With such starting materials such reaction conditions increase the likelihood of PAH and acrylamide formation.

The smoky-like aroma profile of flavoring composition are primarily due to the presence of certain phenolic compounds.

Hence it is a purpose of the present invention to prepare a flavoring composition having smoky-like aroma profile which has a sufficient amount of aroma compound(s) while at the same time reducing the levels of PAH and acrylamide to an acceptable amount.

As provided below, the inventors have devised a new innovative process which significantly reduces the quantity of PAH and acrylamide to an acceptable amount while at the same time having a sufficient amount of aroma compounds. As can be seen in the accompanying examples this results in a flavoring composition having attractive aroma performances. For example the aroma is suggested as being capable of imparting smoky, charred notes to meat flavors, particularly pork and bacon.

By "smoky-like aroma profile" we include where the flavoring composition of the invention imparts a taste and/or smell reminiscent of smoke, i.e. a smoky flavor. The term is well known in the field of flavoring. For example, it is known to refer to something that has a smoky favor and tastes like it has been smoked. The term would hence be clearly understood to the person expert in this field.

The aroma profile is provided by aroma compounds. The "aroma compounds" are selected from the group comprising: 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol E-isoeugenol, Z-isoeugenol, 4-vinyl phenol, 4-propyl guaiacol and 2,6-dimethoxyphenol.

The compounds are well known in the art and can be detected and measured using commonly known analytical methods, examples of which are provided in the accompanying examples.

It can be appreciated by the skilled person that the flavoring composition can comprise one or more of the aroma compounds listed herein. For example, the composition can comprise at least two aroma compounds, preferably least three aroma compounds, preferably least five aroma compounds, preferably least seven aroma compounds, preferably least nine aroma compounds, preferably least ten aroma compounds, preferably least eleven aroma compounds, preferably least twelve aroma compounds, preferably least thirteen aroma compounds, preferably least fourteen aroma compounds, preferably least fifteen aroma compounds, selected from the group comprising: 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol E-isoeugenol, Z-isoeugenol, 4-vinyl phenol, 4-propyl guaiacol and 2,6-dimethoxyphenol.

In a preferred embodiment of the invention flavoring composition comprises 2-methyl phenol, 3-methyl phenol, 4-methyl phenol, 3-ethyl phenol, 4-ethyl phenol, guaiacol, 4-methyl guaiacol, 4-ethyl guaiacol, 4-vinyl guaiacol, eugenol E-isoeugenol, Z-isoeugenol, 4-vinyl phenol, 4-propyl guaiacol and 2,6-dimethoxyphenol.

A preferred embodiment of the invention is wherein one or more of the aroma compounds selected from the group comprising: 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol E-isoeugenol, Z-isoeugenol, 4-vinyl phenol, 4-propyl guaiacol and 2,6-dimethoxyphenol, are present in an amount of at least 0.05 ppm of the flavoring composition.

Preferably the composition can comprise at least two aroma compounds, preferably least three aroma compounds, preferably least five aroma compounds, preferably least seven aroma compounds, preferably least nine aroma compounds, preferably least eleven aroma compounds, preferably least thirteen aroma compounds, preferably least fourteen aroma compound selected from the group comprising: 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol E-isoeugenol, Z-isoeugenol, 4-vinyl phenol, 4-propyl guaiacol and 2,6-dimethoxyphenol are present in an amount of at least 0.05 ppm of the flavoring composition.

In a preferred embodiment of the invention the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol E-isoeugenol, Z-isoeugenol, 4-vinyl phenol, 4-propyl guaiacol and 2,6-dimethoxyphenol and the amount of aroma compounds is approximately 590 ppm or less.

In a preferred embodiment of the invention the aroma compounds consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol E-isoeugenol, Z-isoeugenol, 4-vinyl phenol, 4-propyl guaiacol and 2,6-dimethoxyphenol and the amount of aroma compounds is approximately 590 ppm or less.

The flavoring composition of the invention is characterized by having less than 300 ppb of polycyclic aromatic hydrocarbon(s) and/or acrylamide.

Polycyclic aromatic hydrocarbon(s) (PAH) compounds are well known and well defined in the art.

A polycyclic aromatic hydrocarbon (PAH) is a hydrocarbon that is composed of multiple aromatic rings. The simplest of such chemicals are naphthalene, having two aromatic rings, and the three-ring compounds anthracene and phenanthrene. The terms polyaromatic hydrocarbon or polynuclear aromatic hydrocarbon are also used for this concept.

PAHs are uncharged, non-polar molecules, with distinctive properties due in part to the delocalized electrons in their aromatic rings. Many of them are found in coal and in oil deposits, and are also produced by the thermal decomposition of organic matter—for example, in engines and incinerators or when biomass burns in forest fires.

Examples of PAH include naphthalene, acenaphthylene, acenaphthene, fluorene, phenanthrene, anthracene, fluoranthene, pyrene, benzo(a)anthracene, chrysene, benzo[b]fluoranthene, benzo[k]fluoranthene, benzo[a]pyrene, indeno[1,2,3-c,d]pyrene, dibenzo[a,h]anthracene, benzo[g,h,i]perylene, benzo[j]fluoranthene, cyclopenta[cd]pyrene, dibenzo[a,e]pyrene, dibenzo[a,h]pyrene, dibenzo[a,i]pyrene, dibenzo[a,l]pyrene, 5-methylchrysene, benzo(c)fluorene. The reference PAH is benzo[a]pyrene.

Again, they can be detected and measured using commonly known analytical methods, examples of which are provided in the accompanying examples.

In another embodiment the PAH is benzo[a]pyrene and is less than 10 ppb, preferably less than 5 ppb, more preferably less than 4 ppb, more preferably less than 3 ppb, more preferably less than 2 ppb, more preferably less than 1 ppb, or less.

In a preferred embodiment the flavoring composition has less than 300 ppb acrylamide, preferably less than 200 ppb, more preferably less than 100 ppb, more preferably less than 50 ppb, more preferably less than 20 ppb, more preferably less than 10 ppb, or less.

In a preferred embodiment of the invention the flavoring composition is prepared from a cereal bran.

As used herein "cereal bran" refers to the outer coating or shell a grain and can consist of the pericarp, the seed coat, and the aleurone layer. Examples of cereal brans suitable for the method of preparing the composition of the invention include bran from rice, corn, wheat, oat, rye, barley, sorghum and spelt.

The present inventors performed a series of experiments which are outlined in the accompanying examples. Within these experiments they measured the amount of aroma compounds which could be prepared from different cereal brans.

Accordingly, where the cereal bran is corn the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 1841.3 ppm or less. Preferably the amount of aroma compounds is approximately 590 ppm or less.

Preferably, the cereal bran is corn and the aroma compounds consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 1841.3 ppm or less. Preferably the amount of aroma compounds is approximately 590 ppm or less.

In another embodiment the cereal bran is wheat, and the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 792.4 ppm or less. Preferably the amount of aroma compounds is approximately 320 ppm or less.

Preferably, the cereal bran is wheat, and the aroma compounds consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol.

Preferably the amount of aroma compounds is approximately 792.4 ppm or less. Preferably the amount of aroma compounds is approximately 320 ppm or less.

In another embodiment the cereal bran is rice and the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 2005.2 ppm or less. Preferably the amount of aroma compounds is approximately 270 ppm or less.

Preferably the cereal bran is rice and the aroma compounds consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 2005.2 ppm or less. Preferably the amount of aroma compounds is approximately 270 ppm or less.

In another embodiment the cereal bran is spelt and the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 190 ppm or less.

Preferably the cereal bran is spelt and the aroma compounds consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 190 ppm or less.

In another embodiment the cereal bran is rye and the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 160 ppm or less.

Preferably the cereal bran is rye and the aroma compounds consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 160 ppm or less.

In another embodiment the cereal bran is sorghum and the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 110 ppm or less.

Preferably the cereal bran is sorghum and the aroma compounds consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 110 ppm or less.

In another embodiment the cereal bran is oat and the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 110 ppm or less.

Preferably the cereal bran is oat and the aroma compounds consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 110 ppm or less.

In another embodiment the cereal bran is barley and the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 42 ppm or less.

Preferably the cereal bran is barley and the aroma compounds consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 42 ppm or less.

In a preferred embodiment, the composition is an aqueous composition or a powdered composition, more preferred a powdered composition. Aqueous composition means that the entirety of extracted material is present in solution, wherein the solvent comprises water. Powdered composition means that the entirety of extracted material is present in solid, powdered form.

A further aspect of the invention provides the use of a composition as defined in any of the previous embodiments of the invention for providing a smoky-like aroma to a flavoring composition.

Hence the composition for use in this method of the invention comprises one or more aroma compound(s) selected from the group comprising: 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol E-isoeugenol, Z-isoeugenol, 4-vinyl phenol, 4-propyl guaiacol and 2,6-dimethoxyphenol, characterized in that the composition has less than 300 ppb of polycyclic aromatic hydrocarbon(s) and/or acrylamide. All other embodiments of the invention described herein in relation to the composition are included in this aspect of the invention, including the type and amount of aroma compounds.

As discussed above the present inventors have developed a new innovative process which significantly reduces the quantity of PAH and/or acrylamide to an acceptable amount while at the same time having a sufficient amount of aroma compounds.

Hence a further aspect of the invention provides a method of preparing a flavoring composition of the invention comprising:

(i) heating cereal bran to a temperature of 200-250° C. for between 1 to 5 hours without the addition of exogenous water.

(ii) collecting the flavoring composition produced by step (i)

As described above aroma compound(s) impart taste and/or smell reminiscent of smoke. Typical "aroma compounds" are often derived from phenols. Phenylpropanoic acids like coumaric, ferulic and sinapic acid are precursors for smoke-like phenols. Therefore when devising the present invention the inventors selected cereal bran as a staring material since they are rich in ferulic and other phenylpropanoic acids, inexpensive, but have food status.

As used herein "cereal bran" refers to the outer coating or shell a grain and can consist of the pericarp, the seed coat, and the aleurone layer. Examples of cereal brans suitable for use the method of preparing the composition of the invention include bran from rice, corn, wheat, oat, rye, barley, sorghum and spelt. Preferably the cereal bran is rice, corn or wheat bran.

In step (i) of the method of the invention the cereal bran is heated at temperature of 200-250° C. for between 1 to 5 hours without the addition of exogenous water. The selection of a temperature of 200-250° C. is important since it is lower than the temperatures typical used to prepare smoke extracts from wood based starting materials and will lead to lower amount of PAH in the composition. Since some countries require that food preparations are prepared below an upper limit of 240° C., preferably a temperature of 200-240° C. is used.

The time of between 1 to 5 hours is selected since it is within this window that the most amount of aroma compound(s) will be generated.

The present inventors preformed a series of experiments which are outlined in the accompanying examples. Within these experiments they measured the amount of aroma compounds which could be prepared from cereal brans heated to different temperatures for around 5 hours.

Hence an embodiment of the present method of the invention is wherein the cereal bran is heated to 200° C. for 5 hours and the aroma compounds in the flavoring composition comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 77 ppm or less. Preferably the cereal bran is rice bran.

Preferably the cereal bran is heated to 200° C. for 5 hours and the aroma compounds in the flavoring composition consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 77 ppm or less. Preferably the cereal bran is rice bran.

Hence an embodiment of the present method of the invention is wherein the cereal bran is heated to 220° C. for 5 hours and the aroma compounds in the flavoring composition comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 140 ppm or less. Preferably the cereal bran is rice bran.

Preferably the cereal bran is heated to 220° C. for 5 hours and the aroma compounds in the flavoring composition consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 140 ppm or less. Preferably the cereal bran is rice bran.

Hence an embodiment of the present method of the invention is wherein the cereal bran is heated to 225° C. for 5 hours and the aroma compounds in the flavoring composition comprises 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 232 ppm or less. Preferably the cereal bran is rice bran.

Preferably the cereal bran is heated to 225° C. for 5 hours and the aroma compounds in the flavoring composition consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 232 ppm or less. Preferably the cereal bran is rice bran.

Hence an embodiment of the present method of the invention is wherein the cereal bran is heated to 230° C. for 5 hours and the aroma compounds in the flavoring composition comprises 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 245 ppm or less. Preferably the cereal bran is rice bran.

Preferably the cereal bran is heated to 230° C. for 5 hours and the aroma compounds in the flavoring composition consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 245 ppm or less. Preferably the cereal bran is rice bran.

Hence an embodiment of the present method of the invention is wherein the cereal bran is heated to 235° C. for 5 hours and the aroma compounds in the flavoring composition comprises 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 274 ppm or less. Preferably the cereal bran is rice bran.

Preferably the cereal bran is heated to 235° C. for 5 hours and the aroma compounds in the flavoring composition consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 274 ppm or less. Preferably the cereal bran is rice bran.

Hence an embodiment of the present method of the invention is wherein the cereal bran is heated to 250° C. for 5 hours and the aroma compounds in the flavoring composition comprises 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 337 ppm or less. Preferably the cereal bran is rice bran.

Preferably the cereal bran is heated to 250° C. for 5 hours and the aroma compounds in the flavoring composition consist of 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol. Preferably the amount of aroma compounds is approximately 337 ppm or less. Preferably the cereal bran is rice bran.

However, it is preferred that the cereal bran is heated to 235° C. or less.

The present inventors performed a series of experiments which are outlined in the accompanying examples. Within these experiments they measured the amount of aroma compounds which could be prepared from cereal brans heated in the presence or absence of air or nitrogen flow.

It can be seen from the data herein that the presence or air or nitrogen flow increased the amount of aroma compounds which could be from prepared cereal brans.

Hence a preferred embodiment of the method of the invention is wherein step (i) further comprises where the cereal bran is heated in the presence of air or nitrogen flow.

The absence of exogenous water is preferred since water can act to alter the chemical reactions and alter the amount of aroma compound(s) and PAH in the composition of the invention.

In preferred embodiment of the method of the invention is wherein the method further comprises:

(iii) the addition of exogenous water to the heated cereal bran
(iv) collecting the arising hydrodistillate
(v) combining the hydrodistillate of step (iv) with the flavoring composition produced by step (ii)

In this embodiment some exogenous water to the heated cereal bran is added to allow for the heating reactions to complete after the exhaustion of the endogenous water.

The remaining steps in the method of the invention are clear and are also described below in the examples section of the application. Preferably the flavoring composition produced by step (i) is collected as a condensate, hydrodistillation or steam distillation.

A further aspect of the invention provides a flavoring composition prepared according to any of the methods of the invention.

The present invention also relates to the use of flavoring composition as a flavoring ingredient. In other words, it concerns a method or a process to confer, enhance, improve or modify the taste properties of a flavoring composition or of a flavored article, wherein the method comprises adding to said composition or article an effective amount of the invention's flavour profile, e.g. to impart its typical note.

Typical effective amounts are in the order of 0.001 ppm to 1000 ppm, more preferably 0.1 ppm to 500 ppm, more preferably 0.5 ppm to 350 ppm, most preferably 1 ppm to 100 ppm, of the invention's composition based on the weight of the composition or of the article into which it is incorporated.

By "use of a composition" it has to be understood here also the use of any composition of the invention which can be advantageously employed in the flavor industry.

By "taste", it meant to designate the taste perception and the taste sensation.

Said compositions, which in fact can be advantageously employed as flavoring ingredients, are also an object of the present invention.

We also include where in this aspect of the invention where the flavoring composition of the invention or prepared according to any of the methods of the invention is provided in a diluted form. For example, the flavoring composition of the invention may be diluted to a concentration of 75%, 50%, 40%, 30%, 20%, 10%, 5%, 1%, 0.5%, 0.25%, 0.1%, 0.05%, 0.025%, 0.01% with for example water.

Therefore, the present invention also relates to a flavoring composition comprising:

i. at least the flavour composition of the invention
ii. at least one ingredient selected from the group consisting of a flavor carrier, a flavoring co-ingredient and a mixture thereof; and
iii. optionally at least one flavor adjuvant.

By "flavor carrier", it is meant a material which is substantially neutral from a flavor point of view, insofar as it does not significantly alter the organoleptic properties of flavoring ingredients. The carrier may be a liquid or a solid.

Suitable liquid carriers include, for instance, an emulsifying system, i.e. a solvent and a surfactant system, or a solvent commonly used in flavors. A detailed description of the nature and type of solvents commonly used in flavor cannot be exhaustive. Suitable solvents include, for instance, propylene glycol, triacetine, caprylic/capric triglyceride (Neobee®), triethyl citrate, benzylic alcohol, ethanol, vegetable oils such as linseed oil, sunflower oil or coconut oil or terpenes.

Suitable solid carriers include, for instance, absorbing gums or polymers, or even encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloid: Stabilisatoren, Dickungs-und Geliermittel in Lebensmitteln, Band 2 der Schriftenreihe Lebensmittelchemie, Lebensmittelqualität, Behr's VerlagGmbh & Co., Hamburg, 1996. Encapsulation is a well-known process to a person skilled in the art, and may be performed, for instance, using techniques such as spray-drying, agglomeration, extrusion, coacervation and the like.

By "flavoring co-ingredient" it is meant here a compound, which is used in flavoring preparations or compositions to impart a hedonic effect. In other words such an ingredient, to be considered as being a flavoring one, must be recognized by a person skilled in the art as being able to impart or modify in a positive or pleasant way the taste of a composition, and not just as having a taste.

The nature and type of the flavoring co-ingredients present in the flavoring composition do not warrant a more detailed description here, the skilled person being able to select them on the basis of its general knowledge and according to intended use or application and the desired organoleptic effect. In general terms, these flavoring co-ingredients belong to chemical classes as varied as alcohols, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of flavor. It is also understood that said co-ingredients may also be compounds known to release in a controlled manner various types of flavoring compounds.

By "flavor adjuvant" we mean here an ingredient capable of imparting additional added benefit such as a color, a particular light resistance, chemical stability, and so on. A detailed description of the nature and type of adjuvant commonly used in flavoring compositions cannot be exhaustive. Nevertheless, such adjuvants are well known to a person skilled in the art who will be able to select them on the basis of its general knowledge and according to intended use or application.

A composition consisting of at least the flavour composition of the invention and at least one flavor carrier represents a particular embodiment of the invention as well as a flavoring composition comprising at least flavour composition of the invention at least one flavor carrier, at least one flavor co-ingredient, and optionally at least one flavor adjuvant.

Furthermore, the flavour composition of the invention can be advantageously used in all the fields of flavor to positively impart or modify the taste of a consumer product into which said extract is added. Consequently, the present invention relates to a flavored consumer product comprising the flavour composition of the invention as defined above.

The flavour composition of the invention can be added to a flavored consumer product. It can be added as such or as part of an invention's flavoring composition.

For the sake of clarity, by "flavored consumer product" it is meant to designate an edible product which may be food or beverage and which can be fried or not, as well as frozen or not, low fat or not, marinated, battered, chilled, dehydrated, instant, canned, reconstituted, retorted or preserved. Therefore, a flavored article according to the invention comprises the invention's extract, as well as optional benefit agents, corresponding to taste and flavor profile of the desired edible product, e.g. a savory cube.

The nature and type of the constituents of the foodstuffs or beverages do not warrant a more detailed description here, the skilled person being able to select them on the basis of his general knowledge and according to the nature of said product.

Typical examples of said flavored consumer product include:
  seasoning or condiment, such as a stock, a savory cube, a powder mix, a flavored oil, a sauce (e.g. a relish, a barbecue sauce, a dressing, a gravy or a sweet and/or a sour sauce), a salad dressing or a mayonnaise;
  meat-based product, such as a poultry, beef or pork based product, a seafood, surimi, or a fish sausage;
  soup, such as a clear soup, a cream soup, a chicken or beef soup or a tomato or asparagus soup;
  carbohydrate-based product, such as instant noodles, rice, pasta, potatoes flakes or fried, noodles, pizza, tortillas, wraps;

dairy or fat product, such as a spread, a cheese, or regular or low fat margarine, a butter/margarine blend, a butter, a peanut butter, a shortening, a processed or flavored cheese;
  savory product, such as a snack, a biscuit (e.g. chips or crisps) or an egg product, a potato/tortilla chip, a microwave popcorn, nuts, a bretzel, a rice cake, a rice cracker, etc;
  imitation products, such as a dairy (e.g a reformed cheese made from oils, fats and thickeners) or seafood or meat (e.g. a vegetarian meat replacer, a veggie burger) or analogues;
  pet or animal food; or
  beverage such as a hot drink (e.g. a tea or coffee), a soft drink including carbonated, an alcoholic drink (e.g. whisky), a ready-to-drink or a powder soft.

Some of the above-mentioned flavored consumer products may represent an aggressive medium for the flavour composition of the invention, so that it may be necessary to protect the latter from premature decomposition, for example by encapsulation.

In a preferred embodiment, the flavour composition of the invention is added to the food product before the food product is thermally processed, i.e. before e.g. cooking, roasting, or grilling.

The proportions in which the flavour composition of the invention can be incorporated into the various of the aforementioned products vary within a wide range of values. These values are dependent on the nature of the consumer product to be flavored and on the desired organoleptic effect as well as the nature of the co-ingredients in a given base when the composition according to the invention are mixed with perfuming or flavoring ingredients, solvents or additives commonly used in the art.

For example, in the case of flavored consumer product, typical concentrations are in the order of 0.001 ppm to 1000 ppm, more preferably 0.1 ppm to 500 ppm, even more preferably 0.5 ppm to 350 ppm, most preferably 1 ppm to 100 ppm, of the invention's extract or composition based on the weight of the consumer product into which they are incorporated.

The invention will now be described in further detail by way of the following examples which illustrate the benefits and advantages of the present invention.

Example 1: Thermal Generation of Smoke-Like Phenols from Cereal Bran

Abstract

Smoke flavorings have no natural status in the EU. Because there is a business need for natural alternatives, the potential of cereal brans to thermally generate smoke-like odour was investigated. Bran is rich in precursors for phenols that are key odorants in smoked foods. Cereal brans were roasted in a round flask and the emerging condensate was collected. The influence of roasting time and temperature on the formation of selected target phenols was studied, as well as eight cereal bran varieties. From 100 g bran 30-35 ml distillate is obtained with up to 1.9 mg/g target phenols (including up to 0.9 mg/g guaiacol). Corn bran roasted at 235° C. for 3 h received the best sensory rating and was selected for prototyping. It was positively rated by flavourists, the starting raw material corn bran is widely available as food-grade side product from starch production, and corn is not associated with food allergenicity.

Introduction

Smoke flavorings are obtained from wood combustion and condensing the smoke. The resulting smoke condensate (liquid smoke) is purified, further processed and used in foods to confer smoke aroma. However, smoke flavorings have no natural status in the EU. Also, high temperatures during wood pyrolysis cause a substantial risk for forming toxic compounds. Therefore, the polycyclic aromatic hydrocarbons (PAH) content is limited in the EU to 10 μg/kg benzo[a]pyrene (BaP) and 20 μg/kg benz[a]anthracene[1].

Figures 1, 2:
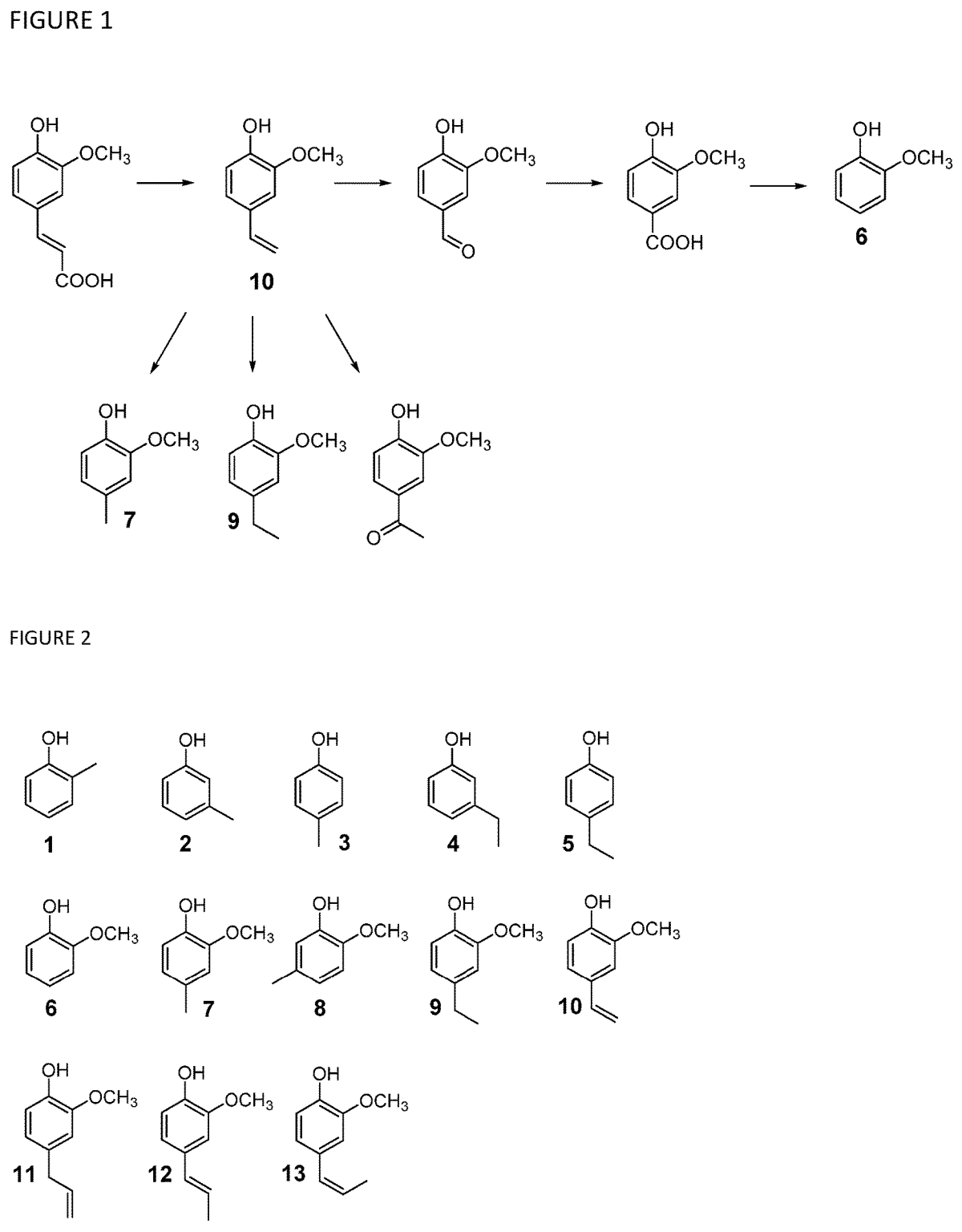

Phenols are essential key odorants both in smoked foods and smoke flavorings[2-8]. Surely they are also indispensable in natural alternatives to smoke flavorings. Phenylpropanoic acids like coumaric, ferulic and sinapic acid are precursors for smoke-like phenols[9]. FIG. 1 illustrates the proposed scheme from Fiddler for thermal decomposition of ferulic acid[10].

The present inventors study generation of smoke-like phenols by heating foodstuff that is rich in phenol precursors. Cereal brans were chosen because they are rich in ferulic and other phenylpropanoic acids[11], inexpensive, but have food status. The chosen temperatures of 200 to 250° C.

condensing distillate was collected via a short-path distillation bridge. Some of the distillates had distinct smoke-like odour.

Consequently, trials were continued at larger scale. Rice bran (100 g) was added to a round flask, which was connected via short path distillation to a cow-type receiver. The flask with the rice bran was immersed in a silicon oil bath, then heated to 235° C. for 5 h. Silicon oil with a high flash point (>300° C.) was used for safety reasons. Five fractions, each corresponding to 1 h, were collected during roasting. After 5 h the flask was removed from the oil bath, water (20 ml) added and distillation continued for another 30 min, and then the resulting distillate (fraction 6) collected.

Table 1 lists distillate volumes for each fraction. A total of 33 ml distillate was collected from 100 g bran, 20.6 ml during the first 5 h of heating (F1-F5) and 12.4 ml after water addition and continued distillation (F6). F3 was the richest fraction in target phenols, followed by F6. The phenol composition differed in the various fractions. 4-Vinylguaiacol (10) had a higher proportion in F1 (56%) and F2 (15%). In contrast, guaiacol (6) increased proportionally from F1 to F5. Fraction F6 had proportionally more 4-ethylphenol (5) and 4-ethylguaiacol (9) than guaiacol (6) compared to F1-F5. Possibly less 5 and 9 was carried over in the distillate during the first 5 hours due to their high boiling points (218° C. and 236° C.) compared to guaiacol (205° C.). After water addition, hydrodistillation may have been more efficient. Consequently, subsequent hydrodistillation after roasting may improve phenolic compound yield from bran.

TABLE 1

| Phenols from roasting rice bran (100 g) at 235° C. for 5 h. | | | | | | | |
|---|---|---|---|---|---|---|---|
| target phenol (μg) | F 1 8.2* | F 2 4.9* | F 3 4.0* | F 4 2.4* | F 5 1.1* | F 6 12.4* | total F1-F6 33.0* |
| 1 2-methylphenol | 8.6 | 98 | 182 | 137 | 53 | 151 | 630 |
| 2 3-methylphenol | 2.4 | 21 | 47 | 42 | 19 | 62 | 193 |
| 3 4-methylphenol | 4.5 | 28 | 75 | 76 | 38 | 155 | 377 |
| 4 3-ethylphenol | 0.0 | 0.2 | 0.6 | 1.3 | 0.6 | 3.1 | 6 |
| 5 4-ethylphenol | 27 | 211 | 728 | 640 | 256 | 1603 | 3465 |
| 6 guaiacol | 201 | 2525 | 4935 | 4054 | 2364 | 2938 | 17017 |
| 7 4-methylguaiacol | 3.4 | 45 | 128 | 157 | 89 | 294 | 716 |
| 8 5-methylguaiacol | 0.6 | 2.3 | 1.1 | 0.6 | 0.5 | 1.2 | 6.2 |
| 9 4-ethylguaiacol | 5.9 | 137 | 597 | 577 | 228 | 1095 | 2640 |
| 10 4-vinylguaiacol | 333 | 564 | 248 | 74 | 104 | 432 | 1755 |
| 11 eugenol | 6.4 | 27 | 86 | 50 | 17 | 73 | 259 |
| 12 E-isoeugenol | 2.0 | 9.3 | 21 | 14 | 16 | 161 | 223 |
| 13 Z-isoeugenol | 0.0 | 3.0 | 5.8 | 4.4 | 5.8 | 35 | 54 |
| total compounds 1-13 (μg) | 595 | 3669 | 7054 | 5827 | 3191 | 7003 | 27339 |

*Distillate volume (ml)

F1 to F5 are distillate fractions collected during 1-5 h heating.

For F6, 20 ml water was subsequently added and distillation was continued for 30 min.

are lower than temperatures of wood fire (≈600° C.) and similar to temperatures used for baking bread, roasting meat or black malt[12].

1. RESULTS AND DISCUSSION

1.1. Phenol Target Odorants

Analyses focused on quantification of aroma relevant phenols. Phenols with concentrations above their odour threshold in smoked food[2, 13, 14], were selected as target phenols (FIG. 2). Other relevant odorants like acetic acid and carbonyl compounds were outside the scope of the study.

1.2. Roasting of Rice Bran

In preliminary trials, rice bran (1-2 g) was heated in glass tubes at 200-350° C. for 2-4 h in a heated metal block. The Heating time markedly influenced phenol yields. The guaiacol yield almost linearly increased over 5 hours at various temperatures (FIG. 3). A temperature of 235° C. produced 2.1-times more guaiacol (17.0 mg) than 220° C. (8.1 mg). Other studied phenols show a similar trend (cf. Table 2). The principal compound was guaiacol, followed by 4-ethylphenol, 4-ethylguaiacol and 4-vinylguaiacol. Their ratio was fairly constant from 220 to 250° C. (65:16:11:8). Because of its low odour threshold (21 μg/kg)[15], 4-methylguaiacol probably also markedly contributes to the aroma. Its percentage of target phenols increases from 1 to 3.6% with temperature.

TABLE 2

| | Influence of roasting temperature on phenol formation from rice bran (100 g) | | | | | |
|---|---|---|---|---|---|---|
| target phenol (µg) | 200° C. 26.1* | 220° C. 23.7* | 225° C. 28.9* | 230° C. 25.9* | 235° C. 31.9* | 250° C. 25.7* |
| 1 2-methylphenol | 184 | 407 | 592 | 624 | 630 | 736 |
| 2 3-methylphenol | 64 | 126 | 195 | 208 | 194 | 244 |
| 3 4-methylphenol | 81 | 168 | 300 | 324 | 376 | 571 |
| 4 3-ethylphenol | 1.5 | 3.8 | 7.4 | 7.2 | 6.1 | 11 |
| 5 4-ethylphenol | 1008 | 2094 | 3388 | 3615 | 3465 | 4768 |
| 6 guaiacol | 4299 | 8056 | 13449 | 14337 | 17017 | 19767 |
| 7 4-methylguaiacol | 74 | 200 | 425 | 510 | 716 | 1205 |
| 8 5-methylguaiacol | 2.6 | 2.7 | 4.0 | 3.2 | 6.2 | 6.1 |
| 9 4-ethylguaiacol | 749 | 1377 | 2405 | 2478 | 2640 | 3438 |
| 10 4-vinylguaiacol | 1010 | 760 | 1545 | 1727 | 1754 | 2213 |
| 11 eugenol | 122 | 204 | 311 | 312 | 258 | 374 |
| 12 E-isoeugenol | 37 | 44 | 479 | 288 | 223 | 278 |
| 13 Z-isoeugenol | 14 | 8.5 | 96 | 66 | 53 | 69 |
| total compounds 1-13 (µg) | 7645 | 13450 | 23198 | 24499 | 27340 | 33681 |

*Distillate volume (ml)

Dry distillation for 5 h, then addition of water (20 ml) and further distillation for 30 min.

A roasting temperature of 235° C. was chosen for subsequent trials, in order to stay below the limit of 240° C. for natural flavouring preparations in the EU[16].

1.3. Influence of Cereal Variety

Different cereal brans have different nutrient compositions (carbohydrate, protein, fats). Likewise, the content in phenolic acids (e.g. ferulic and coumaric acid) varies[11] and hence can influence which phenols and how much is formed.

Figure 4:
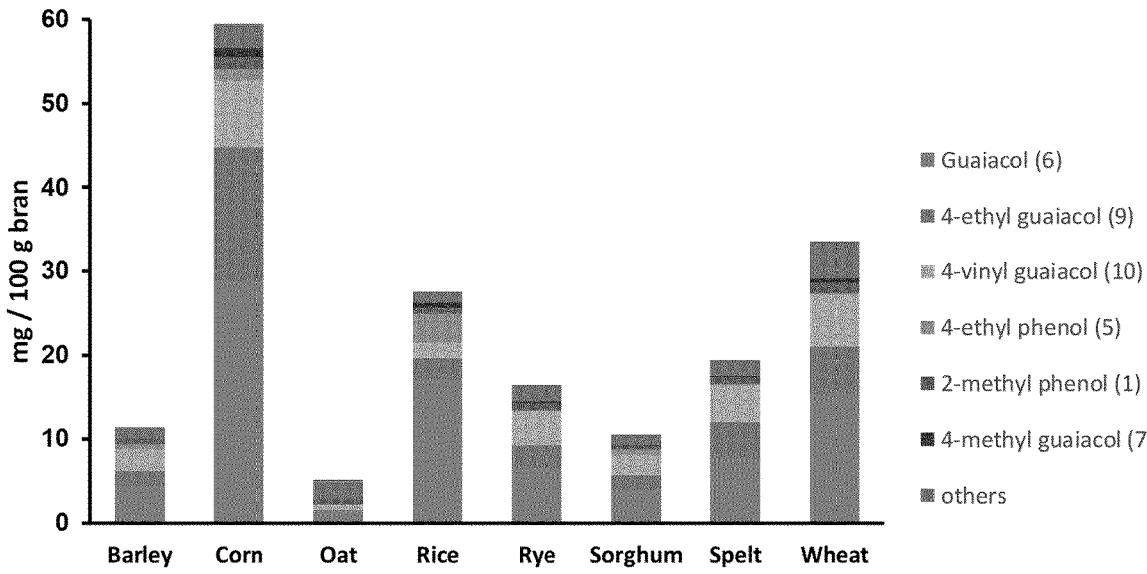

Eight bran types were roasted at 235° C. for 5 h. Corn bran generated most phenols (total 59 mg/100 g), followed by wheat bran (32 mg/100 g) and rice bran (27 mg/100 g) (Table 3). FIG. 4 shows that guaiacol is the dominant phenol in rice bran distillate, while in corn bran distillate 4-ethyl-guaiacol and 4-vinylguaiacol have a comparatively large share. 4-Ethylphenol formation seems to be favourable from rice bran.

1.4. Influence of Other Parameters

Air Flow, Nitrogen Flow, Vacuum During Roasting.

The presence or absence of air during roasting might influence phenol formation since some reaction steps involve oxidation (FIG. 1). Consequently, in a new series of experiments with a reference trial (R1), one with gentle flow of air (R2), a gentle flow of nitrogen (R3), and under reduced pressure (100 mbar, R4) was carried out (Table 4, illustrated FIG. 5). Flow of air, but also flow of nitrogen, increased the total amount of target phenols.

In contrast, vacuum (100 mbar) in general decreased the formation. Interestingly, 4-vinylguaiacol levels increased 8-times under vacuum. The reason for the high 4-vinylguai-acol concentration in R4 might be its lower boiling point at 100 mbar. As it is one of first reaction products formed, it might have distilled partially before being further degraded.

TABLE 3

| | Influence of cereal variety on phenol formation from roasting bran (100 g) at 235° C. | | | | | | | |
|---|---|---|---|---|---|---|---|---|
| target phenol (µg) | Barley 28.6* | Corn 32.0* | Oat 31.2* | Rice 31.9* | Rye 35.3* | Sorghum 33.0* | Spelt 34.4* | Wheat 40.9* |
| 1 2-methyl phenol | 474 | 1370 | 596 | 630 | 839 | 450 | 740 | 1208 |
| 2 3-methyl phenol | 398 | 577 | 919 | 194 | 531 | 358 | 528 | 1229 |
| 3 4-methyl phenol | 299 | 501 | 300 | 376 | 250 | 287 | 292 | 544 |
| 4 3-ethyl phenol | 266 | 1029 | 71 | 6.1 | 541 | 245 | 531 | 831 |
| 5 4-ethyl phenol | 641 | 1381 | 31 | 3465 | 109 | 595 | 138 | 192 |
| 6 guaiacol | 4294 | 28873 | 1298 | 17017 | 6373 | 3894 | 7536 | 15382 |
| 7 4-methyl guaiacol | 115 | 1161 | 36 | 716 | 197 | 107 | 226 | 604 |
| 8 5-methyl guaiacol | 0.0 | 1.1 | 11 | 6.2 | 0.0 | 0.0 | 0.4 | 42 |
| 9 4-ethyl guaiacol | 1918 | 15927 | 253 | 2640 | 2877 | 1815 | 4497 | 5655 |
| 10 4-vinyl guaiacol | 2560 | 7899 | 635 | 1754 | 4078 | 2441 | 4354 | 6136 |
| 11 eugenol | 5.9 | 77 | 5.9 | 258 | 34 | 5.6 | 25 | 159 |
| 12 E-isoeugenol | 9.7 | 93 | 14 | 223 | 81 | 10 | 51 | 384 |
| 13 Z-isoeugenol | 5.5 | 36 | 1.7 | 53 | 10 | 5.4 | 9.2 | 45 |
| total compounds 1-13 (µg) | 10987 | 58923 | 4170 | 27340 | 15919 | 10215 | 18928 | 32411 |

*Distillate volume

Dry distillation for 5 h, then addition of water (20 ml) and further distillation for 30 min.

TABLE 4

Influence of various other parameters on phenol formation from roasting rice bran (100 g) at 235° C. (3 h)

| | | R1 | R2 | R3 | R4 | R5 | R6 | R7 |
|---|---|---|---|---|---|---|---|---|
| pretreatment | | | | | | | 150° C./15 h (water) | 150° C./15 h (HCOOH) |
| drying prior roasting | | | | | | freeze-dried | freeze-dried | freeze-dried |
| roasting conditions | | | air flow | N₂ flow | 100 mbar | | | |
| target phenol (µg) | | 28.6* | 30.4* | 31.9* | 26.2* | 23.1* | 19.3* | 12.4* |
| 1 | 2-methylphenol | 591 | 704 | 726 | 512 | 616 | 363 | 68 |
| 2 | 3-methylphenol | 164 | 206 | 197 | 99 | 204 | 165 | 58 |
| 3 | 4-methylphenol | 215 | 302 | 282 | 159 | 292 | 218 | 134 |
| 4 | 3-ethylphenol | 13 | 13 | 11 | 4.7 | 12 | 0 | 0 |
| 5 | 4-ethylphenol | 3099 | 3724 | 3932 | 1342 | 4120 | 2688 | 3608 |
| 6 | guaiacol | 16211 | 20586 | 20798 | 10694 | 19940 | 23916 | 17837 |
| 7 | 4-methylguaiacol | 508 | 759 | 724 | 440 | 725 | 481 | 334 |
| 8 | 5-methylguaiacol | 8.9 | 3.8 | 4.2 | 4.7 | 5.5 | 4.2 | 1.8 |
| 9 | 4-ethylguaiacol | 3263 | 3716 | 3970 | 1944 | 3597 | 2861 | 2506 |
| 10 | 4-vinylguaiacol | 1039 | 1364 | 843 | 8583 | 2984 | 389 | 127 |
| 11 | eugenol | 360 | 376 | 362 | 284 | 403 | 215 | 118 |
| 12 | E-isoeugenol | 257 | 452 | 285 | 396 | 927 | 284 | 56 |
| 13 | Z-isoeugenol | 104 | 137 | 115 | 83 | 187 | 76 | 18 |
| | total compounds 1-13 (µg) | 25832 | 32342 | 32250 | 24545 | 34013 | 31661 | 24865 |

*Distillate volume mL
*Distillate volume
Dry distillation for 3 h at 235° C., then addition of 20 ml and further distillation for 30 min.
R2 and R3 were heated under a gentle flow of air or nitrogen, R4 was heated under vacuum.
R6 and R7 were pre-treated with addition of water or aqueous formic acid and freeze-dried prior to roasting.

Figure 5:
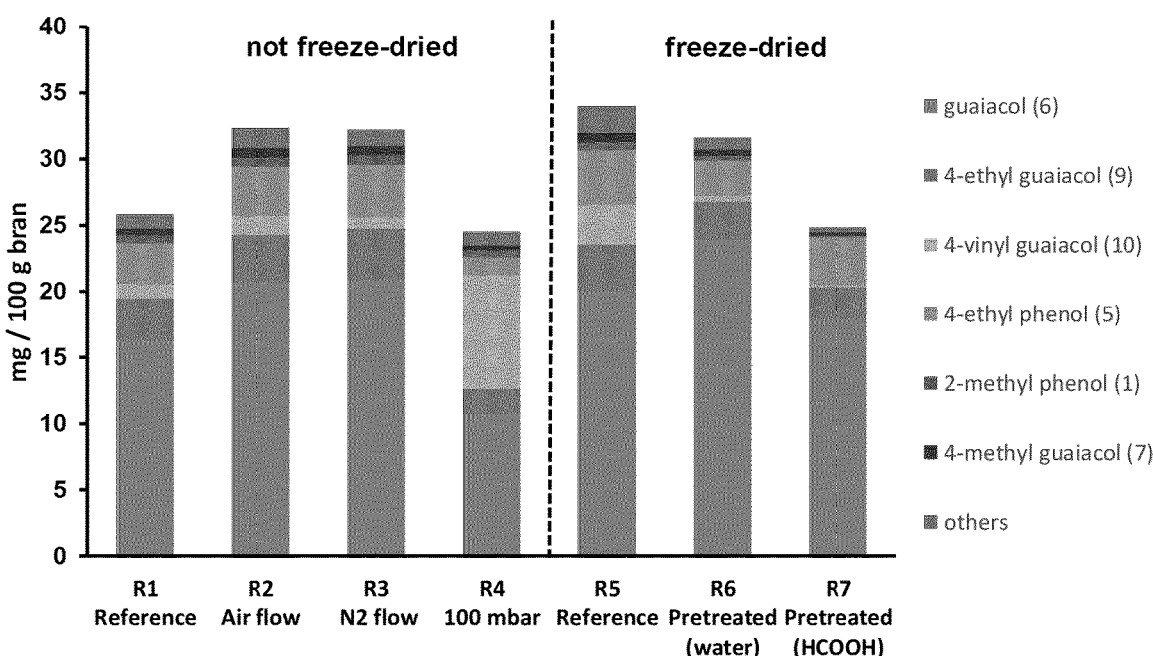
FIG. 5. Influence of other parameters on phenol formation (conditions in Table 4)

The pressure cooked samples R6 and R7 had a lower total phenol concentration than the freeze-dried reference R5 (Table 4, FIG. 5). Amount for all target phenols were lower in the water-treated sample R6 than in R5, in particular 4-vinylguaiacol (389 vs. 2984 µg). Only guaiacol was formed in larger amounts (24 vs. 20 mg). Likewise, in the formic acid-treated rice bran distillate of all target phenols had lower amounts. Apparently, pre-treatment did not give substantially different results for the target phenols than a reference trial. This avenue was not further pursued. Additionally, treatment conditions (150° C. under pressure) would exclude labelling as natural flavouring in the EU (limits are 120° C. for pressure cooking).

1.5. Toxic Compounds: Benzo[a]Pyrene and Acrylamide

Due to the high combustion temperature of wood, smoked foods give rise to health concerns, in particular the possible presence of polycyclic aromatic hydrocarbons (PAH). The Eu regulation limits the concentration of PAH in smoke flavourings. The lead compound benzo[a]pyrene (BaP) is limited to 10 µg/kg[1]. Acrylamide is another potentially toxic compound in thermally treated food. The benchmark level for bran products that are breakfast cereals in the EU is 300 ppb[18].

Two rice bran distillate samples (235° C., 5 h) were analysed for BaP and acrylamide by an external laboratory. The distillate after 5 h of heating (fractions 1-5) as well as the distillate after water addition and further distillation (fraction 6) were investigated. None of the samples contained BaP (Table 5). Acrylamide was detected in fraction 6, however at much lower level than the EU benchmark for acrylamide in breakfast cereals. Corn bran distillate will not be consumed as such, but applied at low levels in food. Therefore, the acrylamide level in the end product will even be lower, probably well below 1 ppb. In summary, these preliminary results indicate no risks caused by PAHs and acrylamide for the roasted cereal bran distillates.

TABLE 5

Concentration of benzo[a]pyrene (BaP) and acrylamide in roasted rice bran distillates

| compound | conc. | fractions 1-5 [a] | fraction 6 [a] | LOQ | EU limit |
|---|---|---|---|---|---|
| benzo(a)pyrene (BaP) | µg/kg | nd | nd | 0.5 | 10 [b] |
| acrylamide | µg/kg | nd | 109.0 | 10 | 300 [c] |

[a] Dry distillation of 100 g bran at 235° C. for 5 h (fractions 1-5), then addition of 20 ml and further distillation for 30 min (fraction 6)
[b] EU regulation 2065/2003: limit in smoke flavourings
[c] EU regulation 2017/2158: benchmark level in breakfast cereals (bran products)

1.6. Sensory Assessment by Flavourists

Three roasted cereal extracts (rice, corn, wheat) were sent to several flavourists of various affiliates for their sensory comments. They were produced from cereal brans by dry distillation at 235° C. for 3 h, followed by water addition and further distillation for 30 min. Smoke notes can find applications both in savoury foods (e.g. ham, sausages) and beverages (e.g. whisky). Therefore, feed-back was sought both from savoury and beverage flavourists. Their comments point to a suitable tasting concentration of 500 ppm All three prototypes had smoke-like character, but also other aroma notes (e.g. roasted, cracker-like, coffee-like). Overall, the corn and wheat prototypes were preferred over the rice variant. Corn bran extract was overall preferred, and on top it is no major food allergen unlike wheat.

2. CONCLUSION

The hypothesis to use cereal bran as starting raw material for dry-heating to produce an ingredient with smoke-like aroma as strongly sought after natural alternative to smoke flavourings was proven and is feasible. The resulting distillates have smoke-like flavour with natural status.

Summary

Higher temperatures and longer reaction times lead to larger amounts of the targeted phenolic compounds.
Corn, wheat and rice bran performed best among the tested cereal brans.
Formation of toxic compounds, like benz[a]pyrene and acrylamide, seems insignificant.
Sensory feed-back from flavourists points to roasted corn bran distillate as preferred smoke flavour replacer.

2.1. Methods

Roasting (gram scale). Rice bran (1-2 g) was heated in a glass tube (10×1.5 cm, ground joint 14/20) in a high temperature dry block heater (Grant BT5D, Grant Instruments, Cambridge, UK) at 200-350° ° C. for 2-4 h. The resulting distillate was collected via a short-path distillation bridge.

Roasting (100 gram scale). Cereal bran (100 g) was added to a 500-ml round flask that connected via short path distillation to a cow-type receiver with receiving flasks. The flask was immersed in a silicon oil bath. Then heating was started. The oil bath was stirred by a magnetic stir bar using a magnetic stirrer (IKA RCT basic, Guangzhou, PRC). It was heated using a protected electric heating coil from Systag (Rueschlikon, Switzerland). Silicon oil with high flash point (>300° C.) was used for safety reasons. In a typical experiment, every hour one fractions was collected, in total 5 fractions. Then the round flask was removed from the oil bath, water (20 ml) was added via the short path distillation piece and then distillation was continued for another 30 min (fraction 6). All fractions were centrifugated and kept refrigerated for analysis.

Thermal pre-treatment of bran. As reference, rice bran (100 g) was freeze-dried using an Alpha 1-4 LSCbasic freeze-drier (Martin Christ, Osterode, Germany). For pre-treatment with water, rice bran was homogeneously mixed with water (1:2.5 w/w) and added to a 100-ml digestion autoclave (Xi'an Instruments Ltd., PRC), which was placed in a laboratory oven (Binder ED 23, Binder, Shanghai, PRC) at 150° C. After 15 h the autoclave was let come to room temperature, and the pre-treated bran slurry was freeze-dried. A similar experiment was carried out with 10% formic acid instead of water.

3. REFERENCES

1. European Parliament. REGULATION (EC) No 2065/2003 OF THE EUROPEAN PARLIAMENT AND OF THE COUNCIL of 10 Nov. 2003 on smoke flavourings used or intended for use in or on foods. *Official Journal of the European Union* 2003, 46, L 309/1.
2. Kosowska, M.; Majcher, M. A.; Jelen, H. H.; Fortuna, T., Key Aroma Compounds in Smoked Cooked Loin. *J Agric Food Chem* 2018, 66, 3683-3690.
3. Varlet, V.; Serot, T.; Cardinal, M.; Knockaert, C.; Prost, C., Olfactometric determination of the most potent odor-active compounds in salmon muscle (Salmo salar) smoked by using four smoke generation techniques. *J Agric Food Chem* 2007, 55, 4518-25.
4. Poisson, L.; Schieberle, P., Characterization of the Most Odor-Active Compounds in an American Bourbon Whisky by Application of the Aroma Extract Dilution Analysis. *J Agric Food Chem* 2008, 56, 5813-5819.
5. Giri, A.; Zelinkova, Z.; Wenzl, T., Experimental design-based isotope-dilution SPME-GC/MS method development for the analysis of smoke flavouring products. *Food Addit Contam Part A Chem Anal Control Expo Risk Assess* 2017, 34, 2069-2084.
6. Cadwallader, D. E., Wood smoke flavor. In Handbook of Meat, *Poultry and Seafood Quality*, Nollet, L. M. L., Ed. 2007.
7. Knowles, M. E.; Gilbert, J.; McWeeny, D. J., Phenols in smoked cured meats. Phenolic composition of commercial liquid smoke preparations and Derived Bacon. *J Sci Food Agr* 1975, 26, 189-196.
8. Baloga, D. W.; Reineccius, G. A.; Miller, J. W., Characterization of ham flavor using an atomic emission detector. *J Agric Food Chem* 1990, 38, 2021-2026.
9. Wittkowski, R.; Ruther, J.; Drinda, H.; Rafiei-Taghanaki, F., Formation of Smoke Flavor Compounds by Thermal Lignin Degradation. *In Flavor precursors*, Teranishi, R., Ed. ACS: Washington DC, 1992; pp 232-243.
10. Fiddler, W.; Parker, W. E.; Wasserman, A. E.; Doerr, R. C., Thermal decomposition of ferulic acid. *J Agric Food Chem* 1967, 15, 757-761.
11. Mattila, P.; Pihlava, J.-M.; Hellstroem, J., Contents of Phenolic Acids, Alkyl- and Alkenylresorcinols, and Avenanthramides in Commercial Grain Products. *J Agric Food Chem* 2005, 53, 8290-8295.
12. Hornsey, I. S., Malting. In *Brewing*, Royal Society of Chemistry: Cambridge, 2013; pp 25-65.
13. Shu, N. Starkenmann, C. Cured ham knowledge. Analysis of two European ham selected as golden standards; 2013, 5816-R.
14. Poisson, L. Charakterisierung der Schlüsselaromastoffe in amerikanischem Bourbon Whisky und schottischem Single Malt Whisky. PhD thesis. Technical University Munich, 2003.
15. https://www.leibniz-lsb.de/en/databases/leibniz-Isbtum-odorant-database/copyright-and-citation/
16. European Parliament. REGULATION (EC) No 1334/2008 OF THE EUROPEAN PARLIAMENT AND OF THE COUNCIL of 16 Dec. 2008 on flavourings and certain food ingredients with flavouring properties for use in and on foods and amending Council Regulation (EEC) No 1601/91, Regulations (EC) No 2232/96 and (EC) No 110/2008 and Directive 2000/13/EC. *Official Journal of the European Union* 2008, 51, L354/34.
17. Esposito, D.; Antonietti, M., Redefining biorefinery: the search for unconventional building blocks for materials. *Chem Soc Rev* 2015, 44, 5821-35.
18. European Commission. COMMISSION REGULATION (EU) 2017/2158 of 20 Nov. 2017 establishing mitigation measures and benchmark levels for the reduction of the presence of acrylamide in food. *Official Journal of the European Union* 2017, 60, L 304/24.

Example 2: Compositions

The inventors reviewed the composition of products reported in the following documents.

D1: Ross et al, J Analytical and Applied Pyrolysis 2011, vol 7, no 6, pages 763-776.
D2: Knowles et al J. Science of Food and Agriculture 1975, vol 26, no 2, pages 189-196
D3: Anonymous Guiaiacol
D4: Wittkowski et al Chemistry, Process Design, and safety for the nitration industry ACS Symposium Series 13 May 1992, vol 190, pages 232-243

D5: Kosowska et al J Agricutural and Food Chemistry vol 66, no 14, pages 3683-3690

The results are shown in the Table 6 below:

| | Phenols | D1 - Abstract | D2 - Table | D3 | D4-table I | D4-Page238 | D5 |
|---|---|---|---|---|---|---|---|
| 1 | 2-methyl phenol | | ✓ | | ✓ | | |
| 2 | 3-methyl phenol | | ✓ | | ✓ | | ✓ |
| 3 | 4-methyl phenol | | ✓ | | ✓ | | ✓ |
| 4 | 3-ethyl phenol | | | | ✓ | | ✓ |
| 5 | 4-ethyl phenol | | | | ✓ | | ✓ |
| 6 | guaiacol | ✓ | ✓ | ✓ | | ✓ | |
| 7 | 4-methyl guaiacol | | ✓ | | | ✓ | ✓ |
| 8 | 5-methyl guaiacol | | | | | ✓ | ✓ |
| 9 | 4-ethyl guaiacol | | ✓ | | ✓ | ✓ | ✓ |
| 10 | 4-vinyl guaiacol | ✓ | ✓ | | ✓ | ✓ | ✓ |
| 11 | eugenol | ✓ | ✓ | | ✓ | ✓ | |
| 12 | E-isoeugenol | ✓ | ✓ | | | ✓ | |
| 13 | Z-isoeugenol | | ✓ | | | ✓ | |
| 14 | 4-vinyl phenol | | | | ✓ | | |
| 15 | 4-propylguaiacol | | ✓ | | ✓ | ✓ | ✓ |
| 16 | 2,6-dimethoxyphenol | | ✓ | | ✓ | | ✓ |

The inventors also further analysed the composition of products from various materials using the methods of the invention described herein:

TABLE 7

| | Cold smoke per 100 g bran (r) target phenol (μg) | 28.6* Barley | 32 Corn | 31.2 Oat | 31.9 Rice | 35.3 Rye | 33 Sorghum | 34.4 Spelt | 40.9 Wheat |
|---|---|---|---|---|---|---|---|---|---|
| 1 | 2-methyl phenol | 474 | 1370 | 596 | 630 | 838 | 450 | 740 | 1208 |
| 2 | 3-methyl phenol | 398 | 577 | 919 | 194 | 531 | 358 | 528 | 1229 |
| 3 | 4-methyl phenol | 299 | 501 | 301 | 376 | 250 | 287 | 292 | 544 |
| 4 | 3-ethyl phenol | 1 | 46 | 5.6 | 5.8 | 19 | 5 | 22 | 62 |
| 5 | 4-ethyl phenol | 641 | 1380 | 30 | 3465 | 109 | 595 | 137 | 192 |
| 6 | guaiacol | 4294 | 28873 | 1298 | 17017 | 6373 | 3894 | 7536 | 15382 |
| 7 | 4-methylguaiacol | 115 | 1161 | 36 | 716 | 198 | 108 | 226 | 604 |
| 8 | 5-methylguaiacol | 0 | 1.1 | 11 | 6.2 | 0 | 0 | 0.4 | 42 |
| 9 | 4-ethylguaiacol | 1918 | 15928 | 253 | 2641 | 2877 | 1815 | 4497 | 5655 |
| 10 | 4-vinylguaiacol | 2560 | 7898 | 634 | 1754 | 4078 | 2441 | 4354 | 6136 |
| 11 | eugenol | 5.9 | 77 | 5.9 | 258 | 34 | 5.6 | 25 | 159 |
| 12 | E-isoeugenol | 9.7 | 93 | 13 | 223 | 81 | 10 | 51 | 384 |
| 13 | Z-isoeugenol | 5.5 | 35 | 1.7 | 53 | 10 | 5.4 | 9.2 | 45 |
| 14 | 4-vinyl phenol | 416 | 698 | 49 | 3097 | 123 | 464 | 116 | 101 |
| 15 | 4-propyl guaiacol | — | Trace | — | Trace | — | — | — | Trace |
| 16 | 2,6-dimethoxyphenol | 411 | 3130 | 989 | 2190 | 964 | 473 | 2254 | 5601 |

The invention claimed is:

1. A method of preparing a flavoring composition, the method comprising:

(i) heating cereal bran to a temperature of 200-250° C. for between 1 to 5 hours without the addition of exogenous water, and (ii) collecting the flavoring composition produced by step (i).

2. The method of claim 1 wherein, in step (i), the cereal bran is heated in the presence or air or nitrogen flow.

3. The method of claim 1 further comprising:

(iii) adding exogenous water to the heated cereal bran, (iv) collecting an arising hydrodistillate, (v) combining the hydrodistillate of step (iv) with the flavoring composition produced by step (ii).

4. The method of claim 1, wherein the flavoring composition of step (ii) is collected as a condensate, hydrodistillation or steam distillation.

5. The method of claim 1, wherein the flavoring composition comprises one or more aroma compound(s) selected from the group consisting of: 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol.

6. The method of claim 1, wherein the flavoring composition contains less than 300 ppb total polycyclic aromatic hydrocarbon(s).

7. The method of claim 1, wherein the flavoring composition contains less than less than 300 ppb acrylamide.

8. The method of claim 1, wherein the flavoring composition contains less than 300 ppb total polycyclic aromatic hydrocarbon(s) and less than 300 ppb acrylamide.

9. The method of claim 1, wherein the flavoring composition contains less than 10 ppb total polycyclic aromatic hydrocarbon(s).

10. The method of claim 5, wherein the cereal bran is corn and the aroma compounds comprise: 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol.

11. The method of claim 5, wherein the cereal bran is wheat, and the aroma compounds comprise: 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol.

12. The method of claim 5, wherein the cereal bran is rice and the aroma compounds comprise 2-methyl phenol, 3-methyl phenol, 4-methyl phenol, 3-ethyl phenol, 4-ethyl phenol, guaiacol, 4-methyl guaiacol, 5-methyl guaiacol, 4-ethyl guaiacol, 4-vinyl guaiacol, eugenol, E-isoeugenol, Z-isoeugenol, 4-vinyl phenol, 4-propyl guaiacol and 2,6-dimethoxyphenol.

13. The method of claim 1, wherein the flavoring composition contains less than 10 ppb benzo(a)pyrene.

14. The method of claim 1, wherein the flavoring composition contains less than 10 ppb of total polycyclic aromatic hydrocarbon(s) and less than 300 ppb of acrylamide.

15. The method of claim 1, wherein the flavoring composition contains less than 20 ppb benzo (a) anthracene.

16. The method of claim 1, wherein the flavoring composition contains less than 10 ppb benzo(a)pyrene, less than 20 ppb benzo (a) anthracene, and less than 300 ppb acrylamide.

\*    \*    \*    \*    \*